US011599546B2

(12) United States Patent
Danilov et al.

(10) Patent No.: US 11,599,546 B2
(45) Date of Patent: Mar. 7, 2023

(54) STREAM BROWSER FOR DATA STREAMS

(71) Applicant: EMC IP Holding Company LLC, Hopkinton, MA (US)

(72) Inventors: Mikhail Danilov, Saint Petersburg (RU); Igor Medvedev, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 207 days.

(21) Appl. No.: 16/864,905

(22) Filed: May 1, 2020

(65) Prior Publication Data
US 2021/0342354 A1 Nov. 4, 2021

(51) Int. Cl.
G06F 16/00 (2019.01)
G06F 16/2455 (2019.01)
G06F 16/28 (2019.01)
G06F 16/182 (2019.01)
(Continued)

(52) U.S. Cl.
CPC .... G06F 16/24568 (2019.01); G06F 16/1734 (2019.01); G06F 16/182 (2019.01); G06F 16/2228 (2019.01); G06F 16/282 (2019.01)

(58) Field of Classification Search
CPC ............. G06F 16/24568; G06F 16/182; G06F 16/2228; G06F 16/282; G06F 16/1734; G06F 16/84; G06F 16/168; G06F 16/9535; G06F 16/958; G06F 11/3072; G06F 12/0891; G06N 5/02
See application file for complete search history.

(56) References Cited

U.S. PATENT DOCUMENTS 3,617,587 A 11/1971 Nayar et al.
5,826,977 A 10/1998 Fowler et al.
(Continued)

FOREIGN PATENT DOCUMENTS

CA 2672879 4/2008
CA 2534170 C * 7/2013
(Continued)

OTHER PUBLICATIONS

Edi Muskardin et al., "Implementation of Hashing Algorithms in Stream Mining", International Conference on Smart Systems and Technologies (SST), Oct. 2018 , pp. 233-238.*
(Continued)

Primary Examiner — Srirama Channavajjala
(74) Attorney, Agent, or Firm — Amin, Turocy & Watson, LLP

(57) ABSTRACT

The described technology is generally directed towards a stream browser that provides a human-readable (e.g., hierarchical) view of event data for a data stream of a data streaming storage service. A stream browser associated with a data stream maintains routing key and event data for the data stream, e.g., in a primary index. The routing keys can correspond to container structures, e.g., folders and subfolders, with the events associated with each routing key corresponding to hierarchical children of the routing key parent container structures (e.g., like files). A secondary index can be used to evict the oldest events from the primary index to limit the number of data stream events returnable by the stream browser to a practical number.

20 Claims, 11 Drawing Sheets

(51) Int. Cl.
*G06F 16/17* (2019.01)
*G06F 16/22* (2019.01)

(56) References Cited

U.S. PATENT DOCUMENTS

| | | | |
|---|---|---|---|
| 7,340,690 B2 * | 3/2008 | Lau | G06F 3/0482 |
| | | | 715/855 |
| 7,430,570 B1 | 9/2008 | Srinivasan et al. | |
| 7,610,437 B2 | 10/2009 | Sinclair et al. | |
| 7,769,717 B2 | 8/2010 | Federwisch et al. | |
| 7,984,084 B2 | 7/2011 | Sinclair | |
| 8,285,918 B2 | 10/2012 | Maheshwari | |
| 8,443,263 B2 | 5/2013 | Selinger et al. | |
| 8,572,091 B1 | 10/2013 | Sivasubramanian et al. | |
| 8,655,825 B2 * | 2/2014 | Roesch | G06N 5/02 |
| | | | 714/39 |
| 8,732,403 B1 | 5/2014 | Nayak | |
| 8,825,848 B1 | 9/2014 | Dotan et al. | |
| 8,873,284 B2 | 10/2014 | Sinclair et al. | |
| 8,984,248 B2 | 3/2015 | Morishita et al. | |
| 9,223,693 B2 | 12/2015 | Sinclair et al. | |
| 9,336,133 B2 | 5/2016 | Sinclair et al. | |
| 9,348,746 B2 | 5/2016 | Sinclair et al. | |
| 9,407,521 B1 | 8/2016 | Kulkarni | |
| 9,465,731 B2 | 10/2016 | Sinclair et al. | |
| 9,514,018 B2 | 12/2016 | Sikri | |
| 9,591,316 B2 * | 3/2017 | Bar Bracha | H04N 19/36 |
| 9,639,589 B1 | 5/2017 | Theimer | |
| 9,715,434 B1 | 7/2017 | Xu et al. | |
| 9,734,050 B2 | 8/2017 | Sinclair et al. | |
| 9,734,911 B2 | 8/2017 | Sinclair et al. | |
| 9,753,932 B1 | 9/2017 | Brow et al. | |
| 9,778,855 B2 | 10/2017 | Sinclair | |
| 9,892,803 B2 | 2/2018 | Reed | |
| 9,898,482 B1 | 2/2018 | Bono | |
| 9,965,215 B1 | 5/2018 | Vazhenin et al. | |
| 10,108,543 B1 | 10/2018 | Duggal et al. | |
| 10,108,544 B1 | 10/2018 | Duggal et al. | |
| 10,120,613 B2 | 11/2018 | Sinclair et al. | |
| 10,133,490 B2 | 11/2018 | Sinclair et al. | |
| 10,255,179 B2 | 4/2019 | Ji et al. | |
| 10,338,834 B1 | 7/2019 | Dighe et al. | |
| 10,430,279 B1 | 10/2019 | Dittia et al. | |
| 10,565,208 B2 * | 2/2020 | Triou, Jr. | G06F 16/24568 |
| 10,628,424 B2 * | 4/2020 | Park | G06F 9/542 |
| 10,705,741 B1 | 7/2020 | Varadarajan et al. | |
| 10,795,812 B1 | 10/2020 | Duggal et al. | |
| 10,860,457 B1 | 12/2020 | Evenson | |
| 10,867,033 B2 * | 12/2020 | Keren | G06F 11/3072 |
| 10,891,228 B2 | 1/2021 | Burow | |
| 10,983,715 B2 | 4/2021 | Sharoni et al. | |
| 11,016,826 B2 | 5/2021 | Lehmann | |
| 11,086,537 B2 | 8/2021 | Byun | |
| 11,194,638 B1 | 12/2021 | Danilov et al. | |
| 11,314,779 B1 | 4/2022 | Jain | |
| 11,354,054 B2 | 6/2022 | Danilov et al. | |
| 2004/0199524 A1 * | 10/2004 | Rys | G06F 16/84 |
| 2005/0025152 A1 | 2/2005 | Georgiou et al. | |
| 2005/0055519 A1 | 3/2005 | Stuart et al. | |
| 2006/0036568 A1 * | 2/2006 | Moore | G06F 16/168 |
| 2006/0058987 A1 | 3/2006 | Kumar et al. | |
| 2007/0033325 A1 | 2/2007 | Sinclair et al. | |
| 2007/0047635 A1 | 3/2007 | Stojanovic et al. | |
| 2007/0220518 A1 | 9/2007 | Verbowski et al. | |
| 2008/0059724 A1 | 3/2008 | Stifter, Jr. | |
| 2008/0082596 A1 | 4/2008 | Gorobets | |
| 2008/0144079 A1 | 6/2008 | Pandey et al. | |
| 2008/0184262 A1 | 7/2008 | Ginis et al. | |
| 2008/0189477 A1 | 8/2008 | Asano et al. | |
| 2008/0288713 A1 | 11/2008 | Lee et al. | |
| 2008/0301135 A1 | 12/2008 | Alves et al. | |
| 2009/0182784 A1 | 7/2009 | Rohit et al. | |
| 2010/0083098 A1 * | 4/2010 | Leme | G06F 16/958 |
| | | | 715/234 |
| 2010/0088296 A1 | 4/2010 | Periyagaram et al. | |
| 2010/0077013 A1 | 5/2010 | Clements et al. | |
| 2010/0125553 A1 | 5/2010 | Huang et al. | |
| 2010/0125794 A1 * | 5/2010 | Hampton | G06F 16/168 |
| | | | 715/853 |
| 2010/0174881 A1 | 7/2010 | Anglin et al. | |
| 2010/0205163 A1 | 8/2010 | Eshghi et al. | |
| 2010/0281081 A1 | 11/2010 | Stager et al. | |
| 2010/0333116 A1 | 12/2010 | Prahlad et al. | |
| 2011/0126099 A1 | 5/2011 | Anderson et al. | |
| 2011/0131588 A1 | 6/2011 | Allam et al. | |
| 2011/0145473 A1 | 6/2011 | Maheshwari | |
| 2011/0161784 A1 | 6/2011 | Selinger et al. | |
| 2011/0249147 A1 | 10/2011 | Ishii | |
| 2012/0102503 A1 | 4/2012 | Meijer et al. | |
| 2012/0109985 A1 | 5/2012 | Chandrasekaran | |
| 2012/0151014 A1 * | 6/2012 | Gokhale | G06F 12/00 |
| | | | 709/219 |
| 2012/0198027 A1 | 8/2012 | Hetzler et al. | |
| 2012/0259994 A1 * | 10/2012 | Gillies | H04L 65/1083 |
| | | | 709/231 |
| 2013/0226931 A1 | 8/2013 | Hazel et al. | |
| 2013/0275808 A1 | 10/2013 | McNeeney et al. | |
| 2014/0006465 A1 | 1/2014 | Davis et al. | |
| 2014/0089264 A1 | 3/2014 | Talagala et al. | |
| 2014/0223115 A1 | 8/2014 | Dinkjian et al. | |
| 2014/0325148 A1 | 10/2014 | Choi et al. | |
| 2014/0365719 A1 | 12/2014 | Kuzmin et al. | |
| 2015/0169449 A1 | 6/2015 | Barrell et al. | |
| 2015/0172120 A1 | 6/2015 | Dwarampudi et al. | |
| 2015/0205816 A1 | 7/2015 | Periyagaram et al. | |
| 2015/0227602 A1 | 8/2015 | Ramu et al. | |
| 2015/0261776 A1 | 9/2015 | Attarde et al. | |
| 2015/0341212 A1 | 11/2015 | Hsiao et al. | |
| 2015/0355862 A1 | 12/2015 | Hayes et al. | |
| 2015/0363245 A1 | 12/2015 | Mutschler | |
| 2016/0042008 A1 | 2/2016 | Tripathy et al. | |
| 2016/0063080 A1 | 3/2016 | Nano et al. | |
| 2016/0210061 A1 | 7/2016 | Soncodi et al. | |
| 2016/0246713 A1 | 8/2016 | Choi et al. | |
| 2016/0321287 A1 * | 11/2016 | Luthra | H04L 67/06 |
| 2016/0337435 A1 | 11/2016 | Nigam et al. | |
| 2016/0350324 A1 | 12/2016 | Wang et al. | |
| 2016/0357476 A1 | 12/2016 | Chen et al. | |
| 2017/0038978 A1 | 2/2017 | Li et al. | |
| 2017/0075832 A1 | 3/2017 | Bhimani et al. | |
| 2017/0075947 A1 | 3/2017 | Kurilov et al. | |
| 2017/0123655 A1 | 5/2017 | Sinclair et al. | |
| 2017/0177249 A1 | 6/2017 | Kurilov et al. | |
| 2017/0177263 A1 | 6/2017 | Das et al. | |
| 2017/0177546 A1 * | 6/2017 | Heinz | G06T 11/206 |
| 2017/0212891 A1 | 7/2017 | Pundir et al. | |
| 2017/0213127 A1 | 7/2017 | Duncan | |
| 2017/0255392 A1 | 9/2017 | Nakashima | |
| 2017/0289214 A1 * | 10/2017 | Cho | H04N 21/8173 |
| 2018/0101842 A1 | 4/2018 | Ventura et al. | |
| 2018/0121307 A1 | 5/2018 | Braun et al. | |
| 2018/0146018 A1 | 5/2018 | Chang et al. | |
| 2018/0176244 A1 | 6/2018 | Gervais et al. | |
| 2018/0184138 A1 | 6/2018 | Shaw et al. | |
| 2018/0189175 A1 | 6/2018 | Ji et al. | |
| 2018/0314727 A1 | 11/2018 | Epstein et al. | |
| 2018/0329644 A1 | 11/2018 | Das et al. | |
| 2018/0332325 A1 | 11/2018 | Kaitchuck | |
| 2018/0332365 A1 * | 11/2018 | Kaitchuck | H04L 65/60 |
| 2018/0332366 A1 | 11/2018 | Paduroiu | |
| 2018/0332367 A1 * | 11/2018 | Kaitchuck | H04L 12/5602 |
| 2018/0336256 A1 | 11/2018 | Li et al. | |
| 2018/0345140 A1 * | 12/2018 | Posin | A63F 13/355 |
| 2019/0004863 A1 | 1/2019 | Mainali et al. | |
| 2019/0026301 A1 | 1/2019 | Wang et al. | |
| 2019/0057138 A1 * | 2/2019 | Knowles | H04L 41/0645 |
| 2019/0129806 A1 | 5/2019 | Hsu et al. | |
| 2019/0138494 A1 | 5/2019 | Inoue | |
| 2019/0197173 A1 | 6/2019 | Tahara et al. | |
| 2019/0278849 A1 | 9/2019 | Chandramouli et al. | |
| 2019/0327297 A1 | 10/2019 | Madani | |
| 2019/0332318 A1 | 10/2019 | Gooding et al. | |
| 2019/0340180 A1 * | 11/2019 | Barsness | G06F 16/9535 |
| 2019/0349422 A1 * | 11/2019 | Dhruvakumar | H04L 67/1095 |

(56) References Cited

U.S. PATENT DOCUMENTS

| | | |
|---|---|---|
| 2020/0034468 A1 | 1/2020 | Lei et al. |
| 2020/0089420 A1 | 3/2020 | Sharoni et al. |
| 2020/0174695 A1 | 6/2020 | Bazarsky et al. |
| 2020/0250172 A1 | 8/2020 | Busjaeger et al. |
| 2020/0310686 A1 | 10/2020 | Truong et al. |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0110328 A1 | 4/2021 | Hsiao et al. |
| 2021/0124746 A1 | 4/2021 | Klaedtke |
| 2021/0157520 A1 | 5/2021 | Bavishi et al. |
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |
| 2021/0374021 A1 | 12/2021 | Santhakumar et al. |
| 2022/0035533 A1 | 2/2022 | Danilov et al. |
| 2022/0182724 A1 | 6/2022 | Gupta et al. |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | WO2002101585 A2 * | 12/2002 |
| WO | WO2004080067 A1 * | 9/2004 |
| WO | WO2009014993 A2 * | 1/2009 |
| WO | WO2015191120 A1 * | 12/2015 |
| WO | WO2015196281 A1 * | 12/2015 |
| WO | WO2018148149 A1 * | 8/2018 |

OTHER PUBLICATIONS

Tony Tung et al., "Topology Dictionary for 3D Video Understanding", IEEE Transactions on Pattern Analysis and Machine Intelligence (vol. 34, Issue: 8, Aug. 2012), Dec. 2011, pp. 1645-1657.*
A. Bulut et al., "Distributed data streams indexing using content-based routing paradigm", 19th IEEE International Parallel and Distributed Processing Symposium, Apr. 2005, pp. 1-10.*
Notice of Allowance dated Aug. 4, 2021 for U.S. Appl. No. 17/200,652, 51 pages.
Akidau et al., "MillWheel: Fault-Tolerant Stream Processing at Internet Scale" Proceedings of the VLDB Endowment, vol. 6, No. 11, 2013, 12 pages.
Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.
"Execution Model" [https://beam.apache.org/documentation/runtime/model/]. The Apache Software Foundation. Retrieved Aug. 26, 2020, 5 pages.
"Apache Beam Programming Guide" [https://beam.apache.org/documentation/programming-guide/]. The Apache Software Foundation. Retrieved Aug. 26, 2020, 69 pages.
"What is Apache Flink?—Applications" [https://flink.apache.org/flink-applications.html#building-blocks-for-streaming-applications]. The Apache Software Foundation Copyright 2014-2019, retrieved Aug. 26, 2020, 7 pages.
"What is Apache Flink?—Architecture" [https://flink.apache.org/flink-architecture.html]. The Apache Software Foundation. Copyright 2014-2019, retrieved Aug. 26, 2020, 3 pages.
"Stateful Function—Event-driven Application on Apache Flink" [https://flink.apache.org/stateful-functions.html]. The Apache Software Foundation. Copyright 2014-2019, retrieved Aug. 26, 2020, 8 pages.
"What is Apache Flink?—Operations" [https://flink.apache.org/flink-operations.html]. The Apache Software Foundation. Copyright 2014-2019, retrieved Aug. 26, 2020, 3 pages.
"Use Cases" [https://flink.apache.org/usecases.html]. The Apache Software Foundation. Copyright 2014-2019, retrieved Aug. 26, 2020, 5 pages.
"Introduction" [http://kafka.apache.org/intro]. The Apache Software Foundation. Copyright 2017, retrieved Aug. 26, 2020, 6 pages.
"Apache Kafka Quickstart" [http://kafka.apache.org/quickstart]. The Apache Software Foundation. Copyright 2017, retrieved Aug. 26, 2020, 6 pages.
"Use Cases" [http://kafka.apache.org/uses]. The Apache Software Foundation. Retrieved Aug. 26, 2020, 3 pages.
"Architecture Overview" [pulsar.apache.org/docs/en/concepts-architecture-overview/]. The Apache Software Foundation. Copyright 2020, retrieved Aug. 26, 2020, 11 pages.
"Messaging" [pulsar.apache.org/docs/en/concepts-messaging/]. The Apache Software Foundation. Copyright 2020, retrieved Aug. 26, 2020, 32 pages.
"Pulsar Overview" [pulsar.apache.org/docs/en/concepts-overview/]. The Apache Software Foundation. Copyright 2020, retrieved Aug. 26, 2020, 2 pages.
Notice of Allowance dated Jun. 28, 2021 for U.S. Appl. No. 16/884,647, 39 pages.
Office Action dated Jun. 29, 2021 for U.S. Appl. No. 16/881,556, 24 pages.
Office Action dated Jan. 29, 2021 for U.S. Appl. No. 16/256,083, 42 pages.
Office Action dated Oct. 1, 2021 for U.S. Appl. No. 16/915,762, 57 pages.
Office Action dated Oct. 1, 2021 for U.S. Appl. No. 17/127,724, 41 pages.
Office Action dated Nov. 10, 2021 for U.S. Appl. No. 16/944,089, 75 pages.
Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance dated Dec. 15, 2021 for U.S. Appl. No. 17/064,747, 54 pages.
Office Action dated Jan. 21, 2022 for U.S. Appl. No. 16/864,892, 26 pages.
Notice of Allowance dated Apr. 27, 2022 for U.S. Appl. No. 17/127,724, 19 pages.
Office Action dated May 24, 2022 for U.S. Appl. No. 17/237,535, 62 pages.
Notice of Allowance dated Feb. 4, 2022 for U.S. Appl. No. 16/915,762, 57 pages.
Office Action dated Apr. 12, 2022 for U.S. Appl. No. 17/038,102, 48 pages.
Notice of Allowance dated Feb. 24, 2022 for U.S. Appl. No. 17/038,079, 55pgs.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi: 10.1109/ECRTS.2008.13, 2008, pp. 201-210. (Year: 2008).
Notice of Allowance dated Feb. 18, 2022 for U.S. Appl. No. 17/083,145, 70pgs.
Office Action dated Apr. 20, 2022 for U.S. Appl. No. 16/944,094, 48 pages.
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on

(56) References Cited

OTHER PUBLICATIONS

Internet-of-Things Design and Implementation (IoTDI), 2020, pp. 66-78, doi: 10.1109/IoTDI49375.2020.00014. (Year: 2020).

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

Office Action dated Jul. 8, 2022 for U.S. Appl. No. 16/864,892, 33 pages.

Office Action dated Sep. 30, 2022 for U.S. Appl. No. 17/408,344, 66 pages.

Office Action dated Sep. 1, 2022 for U.S. Appl. No. 16/944,094, 25 pages.

Office Action dated Jul. 21, 2022 for U.S. Appl. No. 17/070,029, 68 pages.

Notice of Allowance dated Aug. 24, 2022 for U.S. Appl. No. 17/152,544, 55 pages.

Office Action dated Sep. 15, 2022 for U.S. Appl. No. 17/383,425, 61 pages.

Phaujdar, "Understanding Event Streams—A Comprehensive Guide 101_Learn Hevo" [https://hevodata.com/learn/understanding-event-streams/] (Feb. 17, 2021) (Year: 2021).

Dhanushka, "Understanding Kafka Topic Partitions" [https://medium.com/event-driven-utopia/understanding-kafka-topic-partitions-ae40f80552e8] —(Mar. 28, 2021) (Year: 2021).

Splunk, "Comparing Pulsar and Kafka" [https://www.splunk.com/en_us/blog/it/comparing-pulsar-and-kafka-how-a-segment-based-architecture-delivers-better-performance-scalability-and-resilience.html] —(Dec. 5, 2017) (Year: 2017).

Non-Final Office Action received for U.S. Appl. No. 17/063,906, dated Oct. 27, 2022, 59 pages.

Notice of Allowance received for U.S. Appl. No. 17/070,029, dated Dec. 2, 2022, 36 pages.

Non-Final Office Action received for U.S. Appl. No. 17/223,263, dated Nov. 28, 2022, 64 pages.

Non-Final Office Action received for U.S. Appl. No. 17/152,558, dated Dec. 7, 2022, 59 pages.

Non-Final Office Action received for U.S. Appl. No. 17/337,940, dated Dec. 30, 2022, 68 pages.

* cited by examiner

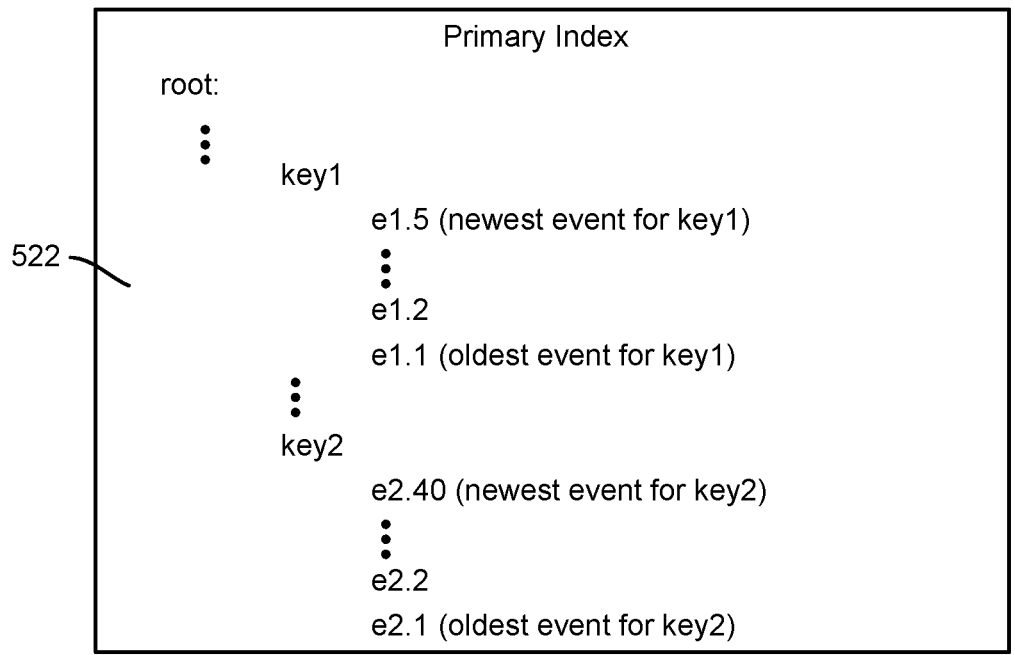
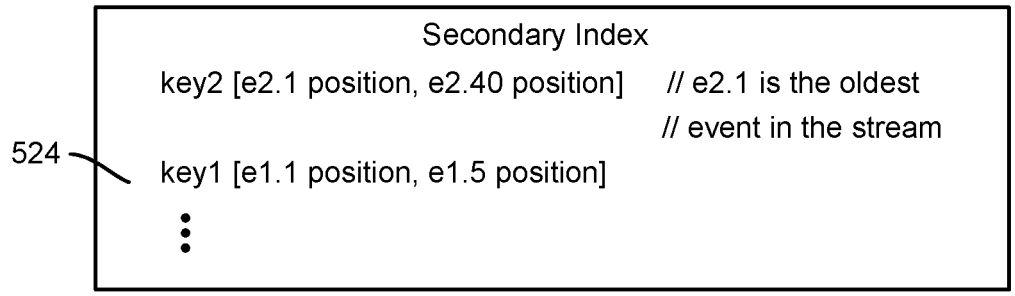
FIG. 5

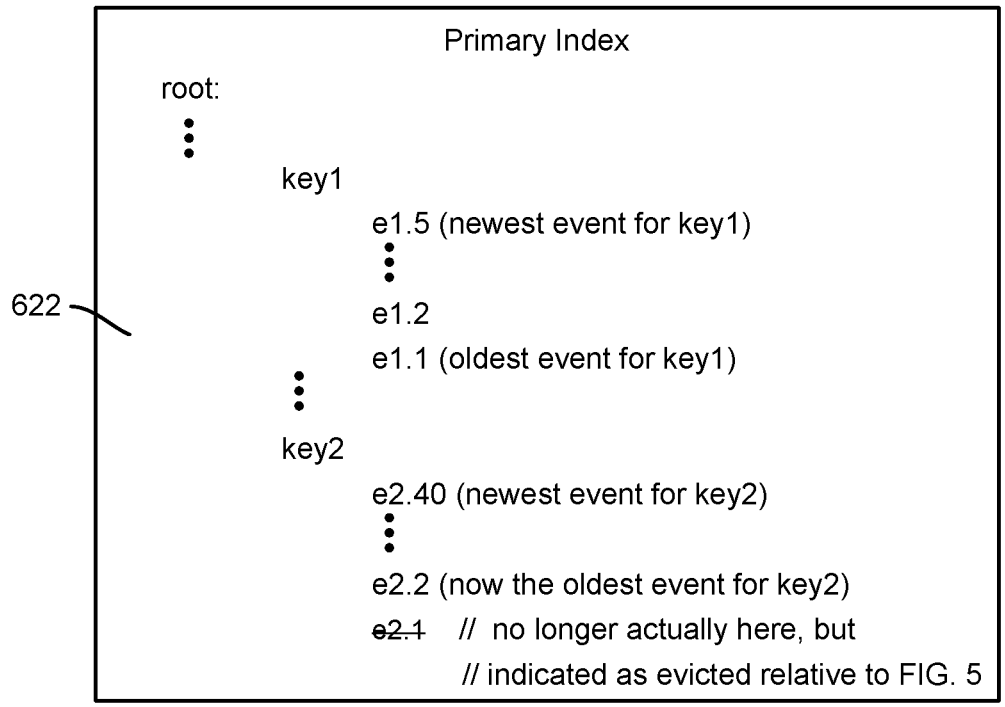
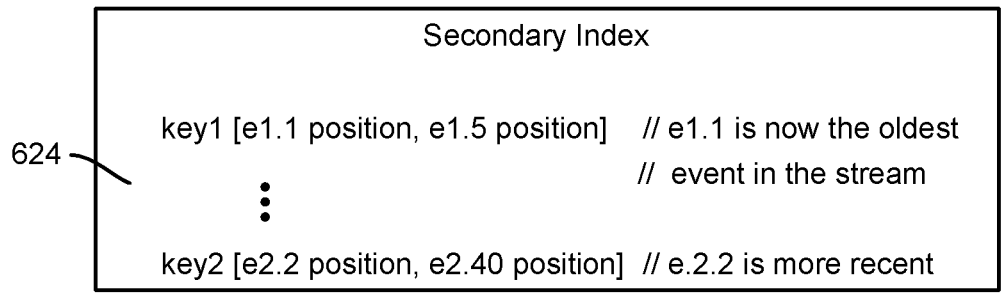
FIG. 6

STREAM BROWSER FOR DATA STREAMS

TECHNICAL FIELD

The subject application relates generally to data storage, and, for example, to a technology that provides a hierarchical view on stream data in storage systems that implement data streams for storing and serving continuous and unbounded data, and related embodiments.

BACKGROUND

Contemporary data storage systems, such as DELL EMC's PRAVEGA system/data storage service, store data in a storage abstraction referred to as a stream. A stream is identified with a name, and can store continuous and potentially unbounded data; more particularly, a stream comprises a durable, elastic, append-only, sequence of stored events.

New events are added to a tail (front) of a stream. As can be readily appreciated, PRAVEGA is thus ideal for IoT (Internet of Things) data, where devices/sensors may generate thousands of data points per second. One stream may be divided into one or more segments, such as based on routing keys associated with the events, such as derived from data naturally occurring in the event, e.g. "machine-id."

One of the problems with streams is that they are difficult for humans to comprehend. This is in part because stream data, typically a very large number of events, is difficult to observe. There is no structure that makes it easy for humans to understand content of a stream, even though stream data sometimes need to be observed by a human, such as for streams produced by analytics applications.

BRIEF DESCRIPTION OF THE DRAWINGS

The technology described herein is illustrated by way of example and not limited in the accompanying figures in which like reference numerals indicate similar elements and in which:

FIG. 5 is a representation of a primary index used to track streamed events via routing keys and a secondary index used to track least recent and most recent event positions for the routing keys, in accordance with various aspects and implementations of the subject disclosure.

FIG. 6 is a representation of the primary index of FIG. 5 when an event is removed from the primary index based on information in the secondary index of FIG. 5, with the secondary index updated in FIG. 6, in accordance with various aspects and implementations of the subject disclosure.

DETAILED DESCRIPTION

Various aspects of the technology described herein are generally directed towards a stream browser that facilitates human interaction with stream data, in particular for a human to observe and navigate through the data (events) in a stream-based data storage system. In one aspect, a hierarchical view on streams is provided by maintaining event container structures (e.g., folders) within a single stream. In this way, content of a stream may be seen and navigated through via a hierarchical view, similar to viewing a file system of folders and files.

It should be understood that any of the examples herein are non-limiting. For instance, some of the examples are based on PRAVEGA data storage technology; however virtually any stream-based data storage system may benefit from the technology described herein. Indeed, the technology described herein can be applied to any stream-based data storage mechanism. As such, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
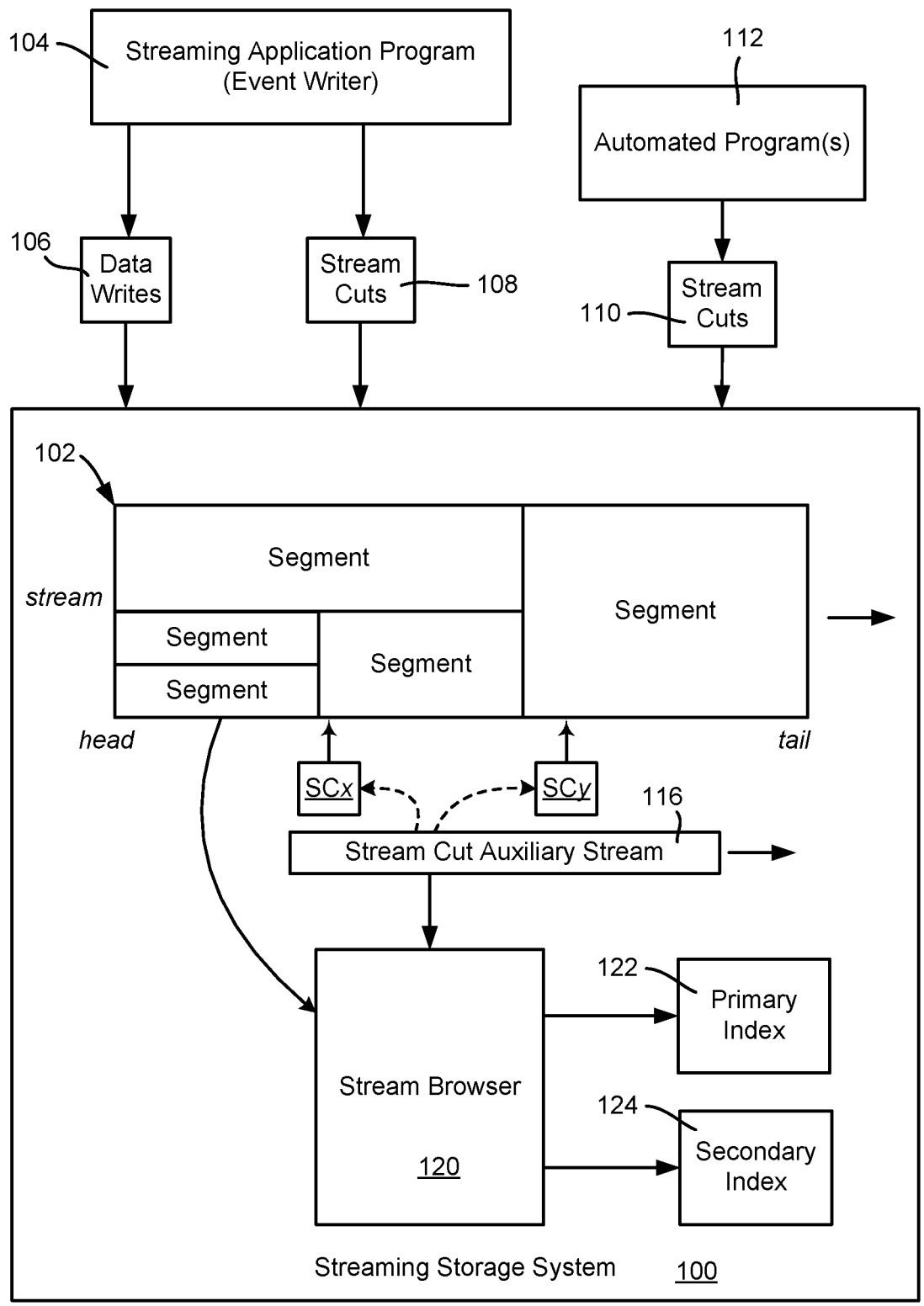
FIG. 1 is a block diagram representation of example writer components and data—related operations in a streaming data storage system that provides a hierarchical view of streamed data via a stream browser, in accordance with various aspects and implementations of the subject disclosure

FIG. 1 shows a streaming data storage system 100 that includes an event stream 102 comprising a data stream of events, with event writes being appended from a head towards a tail direction. As set forth above, events have a routing key. In one implementation, events with the same routing key are guaranteed to be consumed in the order they were written.

As further represented in FIG. 1, a stream such as the stream 102 may be split into a set of shards or partitions generally referred to as stream segments (or simply segments). The segments act as logical containers for events within the stream. When a new event is written to a stream, it is stored to one of the segments based on the event's routing key. More particularly, event routing keys can be hashed to form a key space. The key space is then divided into a number of partitions, corresponding to the number of segments.

In general, an event writer such as a streaming application program 104 sends data writes (events) 106 to the streaming data storage system 100 for appending to the event stream 102. As described herein, the application program 104 can also send stream cuts 108 for associating with a data stream.

More particularly, a position in a stream at an event boundary can be specified using a stream cut. The application program 104 can request association of a stream cut with a stream, as represented by block 108. Instead of, or in addition to, application-specified stream cuts, other stream cuts 110 can be created automatically, such as periodically, by automated program(s) 112 or the like.

The stream cuts for a stream can be considered a series of stream cuts. In one or more implementations, the stream cuts may be maintained as an auxiliary system stream 116 associated with the main data stream, e.g., event stream 102 in FIG. 1. A time value (obtained from the system time) can be associated with each stream cut, such as corresponding to when a given stream cut object is created. For example, the correct system time (block 118) can be obtained via use of the NTP (Network Time Protocol).

As shown in FIG. 1, the logic for providing a hierarchical view of stream data may be implemented in a reader-like program referred to as a stream browser 120. A stream browser 102 can be a dedicated program that is universal and stream data agnostic for any data stream, although it is feasible to have some customization with a specific stream browser for a given data stream.

A user such as an administrator can attach (logically associate) a stream browser (e.g., an application instance) to a stream that was designed to support folders. This enables a stream browser instance, such as the stream browser 120, to collect data for the stream, e.g., the stream 102. As described herein, in one implementation, the stream browser 120 maintains its collected data in a primary index 122 and a secondary index 124.

Turning to aspects related to reading via a stream browser such as the stream browser 120, note that in one implementation, a stream browser is not an ordinary reader, because unlike an ordinary reader that reads both data and metadata from a stream, a stream browser only needs to read the metadata, namely event routing key data and event position data in a stream. A stream browser can be obtained based on an ordinary reader program that is reconfigured to only read metadata rather than also manipulating actual event data.

Figure 2:
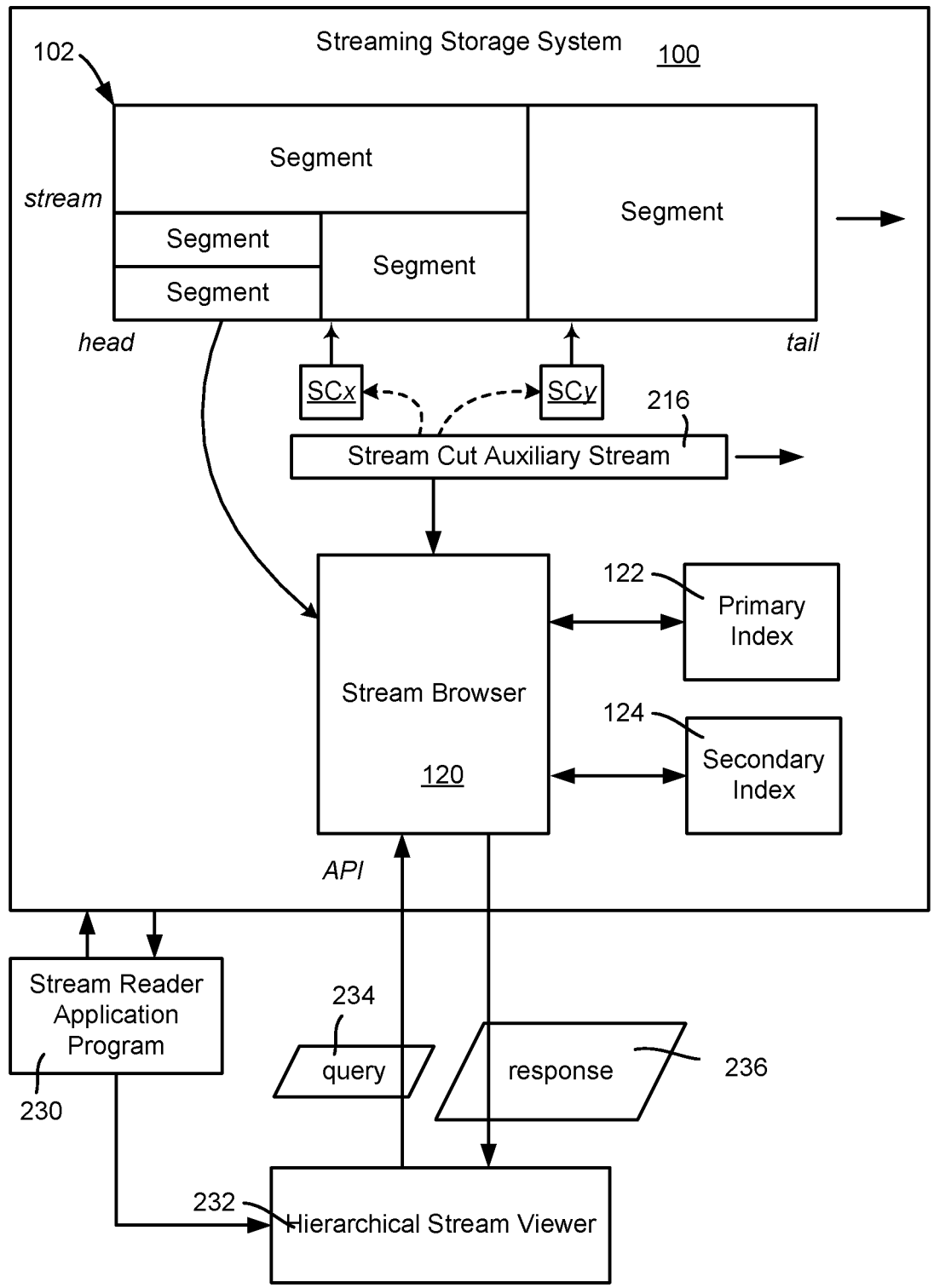
FIG. 2 is a block diagram representation of example reader components and data—related operations in a streaming data storage system that provides a hierarchical view of streamed data via a stream browser, in accordance with various aspects and implementations of the subject disclosure

As shown in FIG. 2, an application program 230 that reads from a stream in general is called a reader. Readers normally do tail reading to perform some kind of real-time analytics on events. Note that output of real-time analytics is expected to be in the form of streams as well. In general, routing key space within a stream is flat, and although it can be hashed and partitioned, the system does so to scale up and down, as the number of parallel segments in a stream can automatically increase and decrease over time based on the I/O load the stream receives.

As described herein, the stream browser technology makes a stream easier for humans to observe, by providing convenient views on a stream's data. Indeed, aspects of the technology described herein are directed towards providing a hierarchical view on streams, which are potentially unbounded. To this end, the technology supports container structures, referred to as event folders, within a single stream. Via the event folders, content of a stream may be seen with a hierarchy similar to viewing content maintained in a hierarchical file system of folders (or directories) and files.

In one aspect, folders are not real data objects, but rather are abstractions that may be created and used to make it easy for a human to understand content of a stream. Folders can be based on a shared routing key prefix for events, that is, for events that have routing keys that begin with a common string. There can be folders (subfolders) within folders.

By way of example, consider the following two events having the routing keys listed below:

installbase/customers/boa/nautilus/serialnumber/healthreports/20191029 installbase/customers/boa/nautilus/serialnumber/healthreports/20191030

These two example routing keys exemplified above have a shared prefix, namely "installbase/customers/boa/nautilus/serialnumber/healthreports/". As described herein, the two events 20191029 and 20191030 can be shown similar to two "files" in a folder named installbase/customers/boa/nautilus/serialnumber/healthreports/.

In one implementation, a stream browser 120 can implement an API set (e.g. REST API) that when called with an appropriate parameter set by a hierarchical stream viewer program 232 or the like, returns a hierarchical view on stream data. For example, one API call may be directed towards listing folder content, which when called in a query 234 (e.g., directed to an object method) with a folder name as a parameter, returns a response 236 that lists folder content comprising a list of any subfolders and final routing keys within the specified folder. When the folder parameter is null or an empty string, the "list folder content" call returns the content of a root folder.

Figure 3:
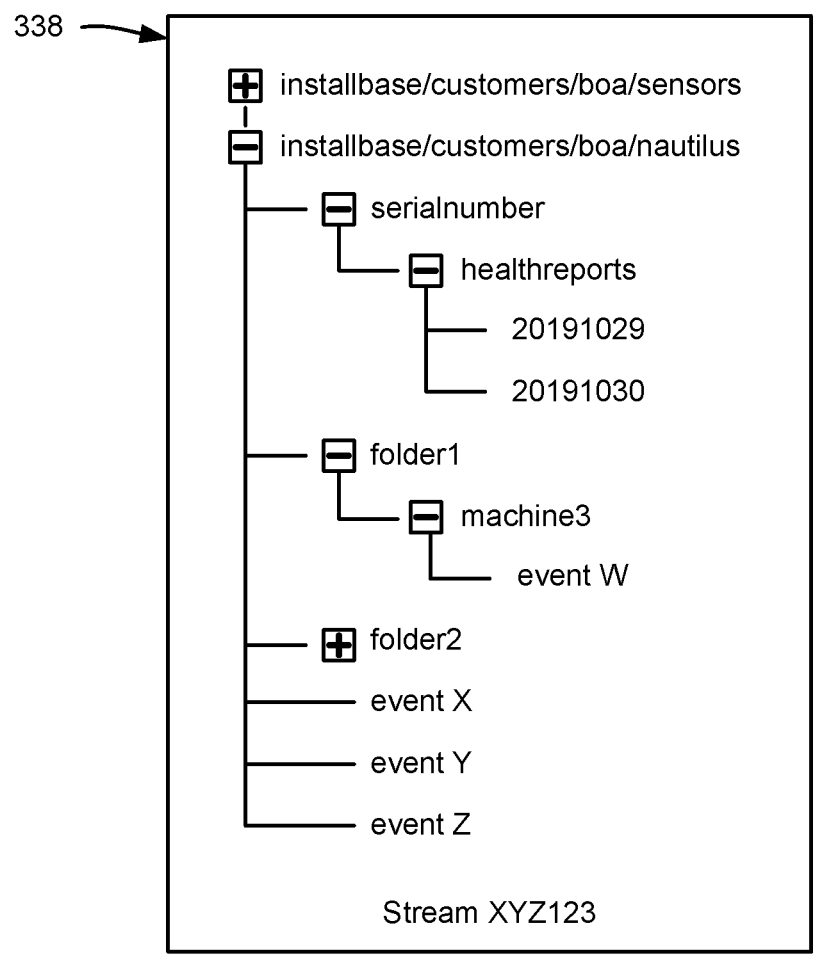
FIG. 3 is a representation of an interactive graphical user interface that displays a hierarchical view of streamed data with routing keys as container structures for events, in accordance with various aspects and implementations of the subject disclosure.

By way of example, FIG. 3 shows one possible, non-limiting way in which the content of a specified folder can be presented to a user. As is understood, any standard set of graphical user interface primitives and techniques may be used to navigate streams, (as well as custom viewers). For example, the response data can be arranged for display in an interactive presentation 338 such as a window, menu or the like. The interactive presentation 338 can facilitate traditional interaction operations, e.g., expanding via interaction with a "+" interactive button, collapsing via interaction with a "−" interactive button, scrolling, and so on.

Another API call can be directed to reading events. In one implementation, a read event call (e.g., corresponding to a read event object method) receives a full routing key as a parameter, and returns the most recent events with the specified full routing key. Note that while this is similar to the above-described "list folder content" call with a full routing key as a parameter, this call can be somewhat more intuitive for users who want to see a list of events under a full routing key. Moreover, the way in which the output is presented can be different, such as shown in the folder view-like presentation 440 of FIG. 4. Note that by coupling to or incorporating aspects of a more conventional reader program (e.g., 230 of FIG. 2), additional information for an event can be presented by interaction with that event.

Figure 4:
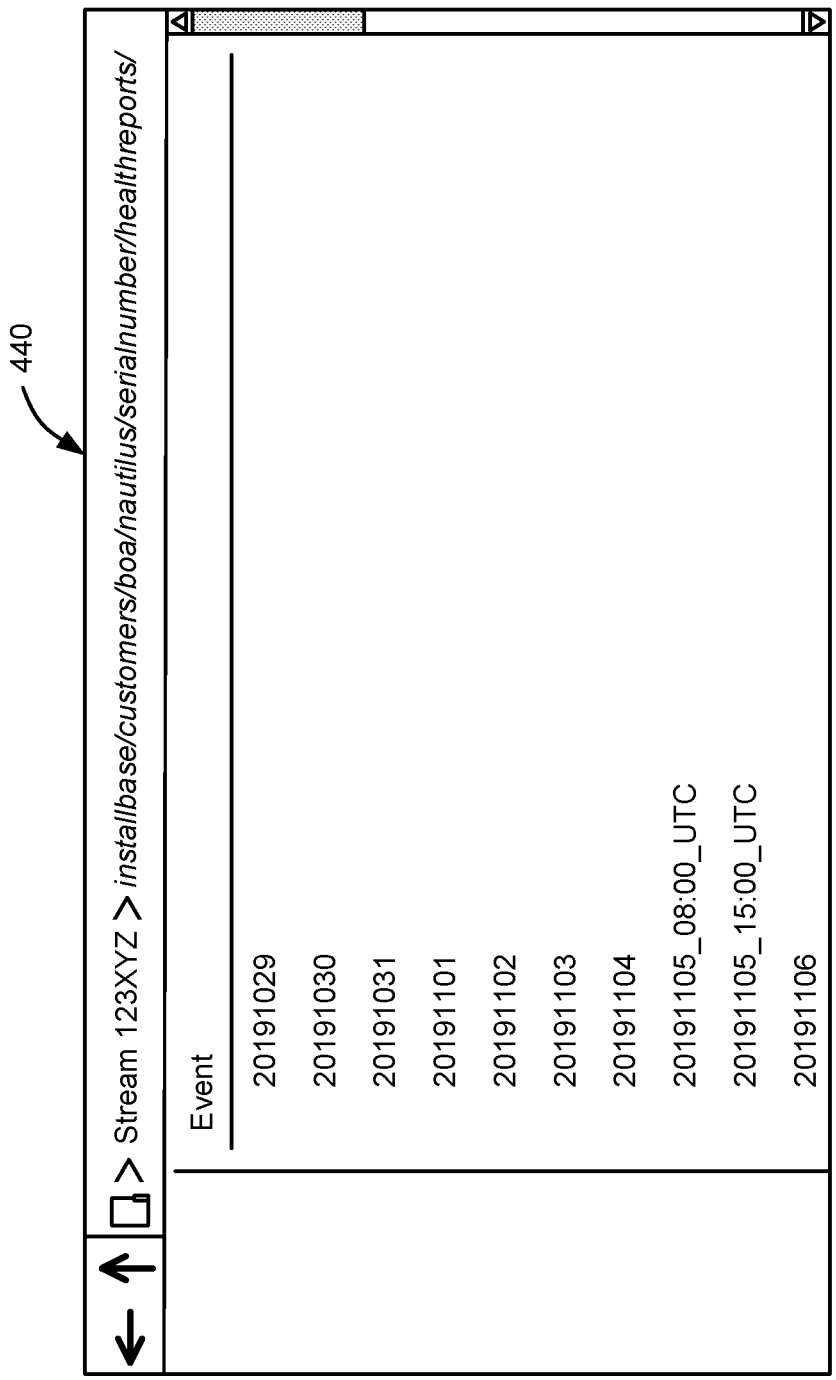
FIG. 4 is a representation of an interactive graphical user interface that displays a hierarchical view of streamed data based on a full routing key as a container structure for its associated events, in accordance with various aspects and implementations of the subject disclosure.

Although not explicitly shown in FIG. 4, it is also feasible to show metadata such as the stream position for an event. Further, stream cuts can be represented wherever one occur on a boundary between two events.

Turning to another aspect, one consideration with streamed data is that a data stream is potentially unbounded and has a potentially unbounded routing key space as well. Because resources are finite, it is not practical to maintain a complete hierarchical view on streams that are too large. As described herein, a cache-like concept can be used to reflect the most recent data in a large data stream.

To this end, a stream browser maintains a list of recent (for some streams all) routing keys in a stream, in the primary index 122 (FIGS. 1 and 2). Note that it may be beneficial to store the keys in a tree-like structure that would reflect the hierarchy of the keys. Because multiple events can be created with a given routing key, a list of events is maintained for each routing key. Each event is described with its position within the stream. The list can be and typically is sorted by position.

Further, an implementation of a stream browser uses a secondary index 124 (FIGS. 1 and 2). In the secondary index 124, a pair of stream positions is associated with each routing key. The first position is the position of the least recent event with the routing key of which the stream browser 120 for the stream 102 is aware. The second position maintained by the secondary index 124 is the position of the most recent event with the routing key. The secondary index 124 can sort the routing keys by the least recent position in a stream associated with the keys.

In general, the secondary index 122 is used to evict (remove) events from the hierarchical view. Events that least recently appeared in a stream are evicted first. An event can be removed from the primary index, and when it is the last event in the list associated with the routing key, the routing key is removed from the primary and secondary indices. Otherwise, the remaining events in the event list from the primary index 122 (to be more precise, the first and the last one) define a new pair of positions that, in turn, define position of the routing key in the secondary index 122.

By way of example, as shown in FIG. 5, a primary index 522 is the data structure behind the hierarchical view, or, in other words, the hierarchical view is a graphical representation of the primary index 122. The primary index may be large, but if not sufficiently large (e.g., beyond an administrator defined size), the primary index does not need to evict any of its data.

However, if the primary index grows too large, an eviction mechanism is needed, which relies on the secondary index. In a typical scenario, the oldest events, based on their least recent positions in the stream (e.g., instead of time, which may not be maintained for an event) are evicted. While feasible to scan the primary index to find one or more oldest event(s), doing so can be highly inefficient.

More particularly, as shown in FIG. 5, the oldest events can be maintained at the top of the secondary index 524. If eviction is needed, in an atomic operation, the first (oldest) event from the secondary index 524 is determined, and the event is deleted from the primary index 522; the secondary index 524 is updated accordingly. The post-eviction results are shown in FIG. 6.

In the particular example of FIGS. 5 and 6, if time to evict, the first event (e.2.1) is determined from the secondary index 524, and removed from the primary index 524, resulting in the modified primary index 624 of FIG. 6. Then (still as part of the atomic operation), a new positions pair is created for key2, with the proper position for key2 determined via the secondary index 524. The updated secondary index 624 now maintains data indicating that for key1 [e1.1 position, e1.5 position], the event e1.1 is now the oldest event in the primary index 622.

It should be noted that because storage capacity is finite, the streaming storage system 100 provides a mechanism to cut a stream short. More particularly, a stream can be truncated from a stream cut (a given consistent position) associated with a stream, as represented in FIGS. 2 and 2. The events that are ahead of the truncation stream cut's position, (that is, older events), are removed from the stream. The stream browser 120 may be configured to wait for stream cut truncation events to cut the hierarchical view. As with the above-described eviction technique, the secondary index 124 can be used to find the events that are ahead of the consistent stream cut position that is being used to truncate a stream. The stream browser 120 can remove such events from its primary index 122 and update the secondary index 124 as generally descried above.

Turning to another aspect, a stream browser can be attached to a stream at an arbitrary time. It may be desirable to attach a stream browser to a stream when the stream is created, because if so, the stream browser can work using tail reading only. In contrast, when a stream browser is attached an already-existing stream, a bootstrapping phase is needed. To this end, the attached stream browser reads historical events to fill its data structures (primary and secondary indices) with data for existing events; (note that tail reads can be performed in parallel). Note that it is generally more practical to read the stream events starting from the tail, and stop when (and if) the stream browser hits a determined limit, e.g., capacity, memory size, or the like. A sequence of stream stream cuts can be used to move backwards in the stream data, thereby using consistent positions within the stream. Pairs of neighbor stream cuts can be used to define ranges of historical events for the stream browser to read.

It should be noted that when viewing events with a given routing key, the events can be seen as a specific stream. As a stream browser is generally directed towards providing an interface to a human, at some level the events need to be in a human-readable format. If not so formatted, a stream browser can be customized to make unreadable (e.g., binary data) human-readable. Once processed in this way, such a stream can be presented as a marked text document with its events.

Note that the number of events may be great. Therefore, a sliding window technique can be used to fetch and keep in memory only a necessary part of the events. As more recent events are more typically more valuable, the events may be shown in the reverse order, that is, the document may start with the most recent events and end with the least recent events.

Figure 7:
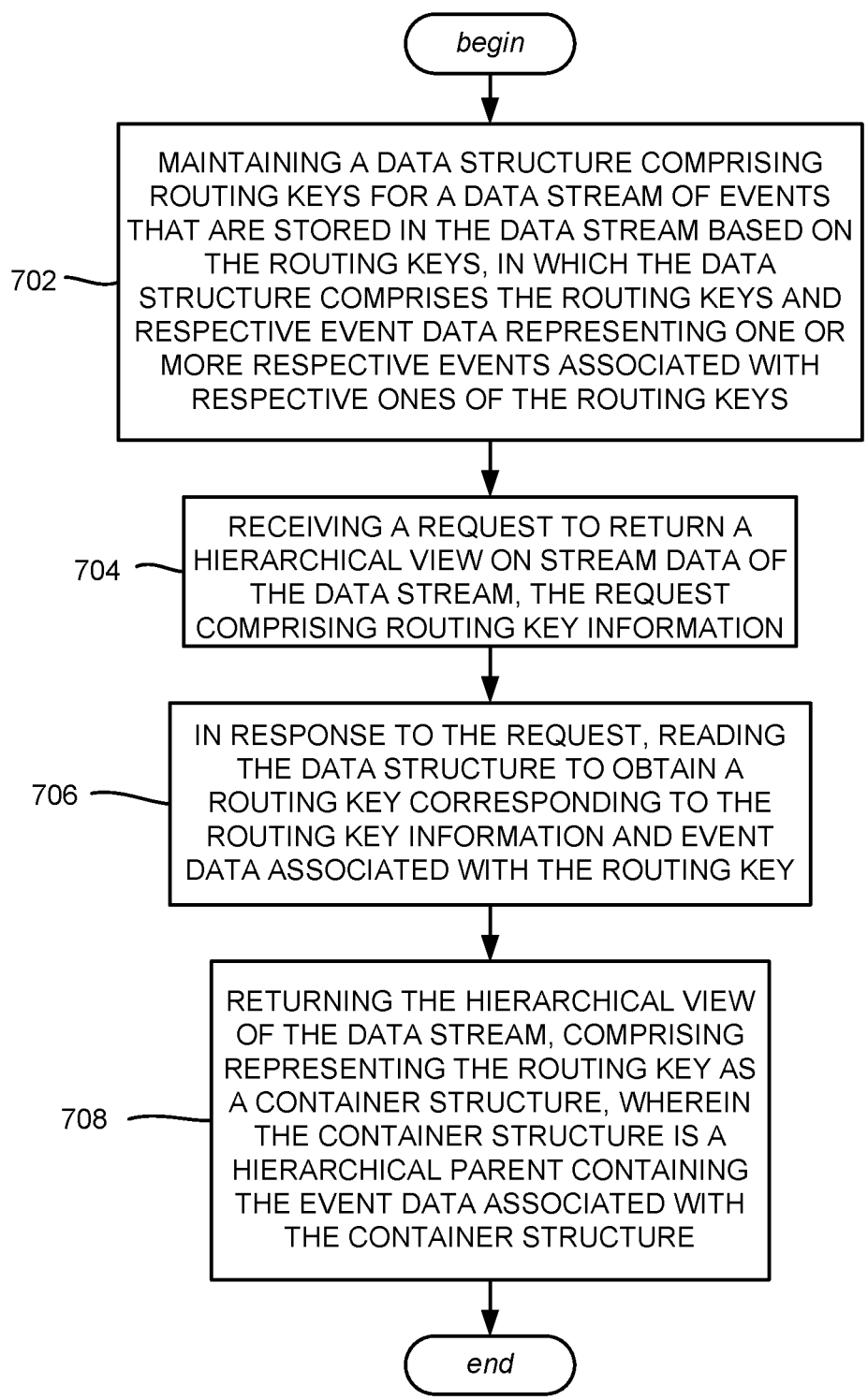
FIG. 7 is a flow diagram showing example operations related to returning a hierarchical view of a data stream based on routing key information, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents maintaining a data structure comprising routing keys for a data stream of events that are stored in the data stream based on the routing keys, in which the data structure comprises the routing keys and respective event data representing one or more respective events associated with respective ones of the routing keys. Operation 704 represents receiving a request to return a hierarchical view on stream data of the data stream, the request comprising routing key information. Operation 706 represents, in response to the request, reading the data structure to obtain a routing key corresponding to the routing key information and event data associated with the routing key. Operation 708 represents returning the hierarchical view of the data stream, comprising representing the routing key as a container structure, wherein the container structure is a hierarchical parent containing the event data associated with the container structure.

Receiving the request can comprise receiving a list folder content request; the routing key information in the request can specify a first part of the routing key that corresponds to a folder, and the returning the hierarchical view can comprise listing respective one or more second parts of the routing key as respective one or more subfolders with respective one or more events as the event data associated with the respective one or more subfolders.

Receiving the request can comprise receiving a list folder content request; the routing key information in the request can specify null or an empty string, and returning the hierarchical view can comprise listing subfolder content and event content of a root folder.

Receiving the request can comprise receiving a read event request; the routing key information in the request can specify a full routing key, and the returning the hierarchical view can comprise listing one or more events associated with the full routing key as the event data associated with the container structure corresponding to the full routing key.

The event data can comprise two or more events, the data structure can comprise stream position data for each of the two or more events, and further operations can comprise sorting the events by respective stream position data before returning the hierarchical view of the data stream.

The data structure can be a first data structure, and further operations can comprise maintaining a second data structure that relates respective routing keys to respective event positions in the data stream; the respective event positions for a respective routing key can identify a respective first position in the data stream of a least recent event associated with the respective routing key and a respective second position in the data stream of a most recent event associated with the respective routing key. The event data can com two or more events, and further operations can comprise accessing the second data structure based on the routing key to evict one or more least recent events from the first data structure. The data stream can be associated with a stream cut, the data stream can be truncated to remove events based on the stream cut, and further operations can comprise accessing the second data structure based on the stream cut to remove event data from the first data structure that correspond to truncated events, and to modify event position data in the second data structure.

The event data can exceed a resource limitation, and returning the hierarchical view of the data stream can comprise providing a sliding window of event data that does not exceed the resource limitation.

Maintaining the data structure comprising the routing keys for the data stream can comprise maintaining a hierarchical data index.

Figure 8:
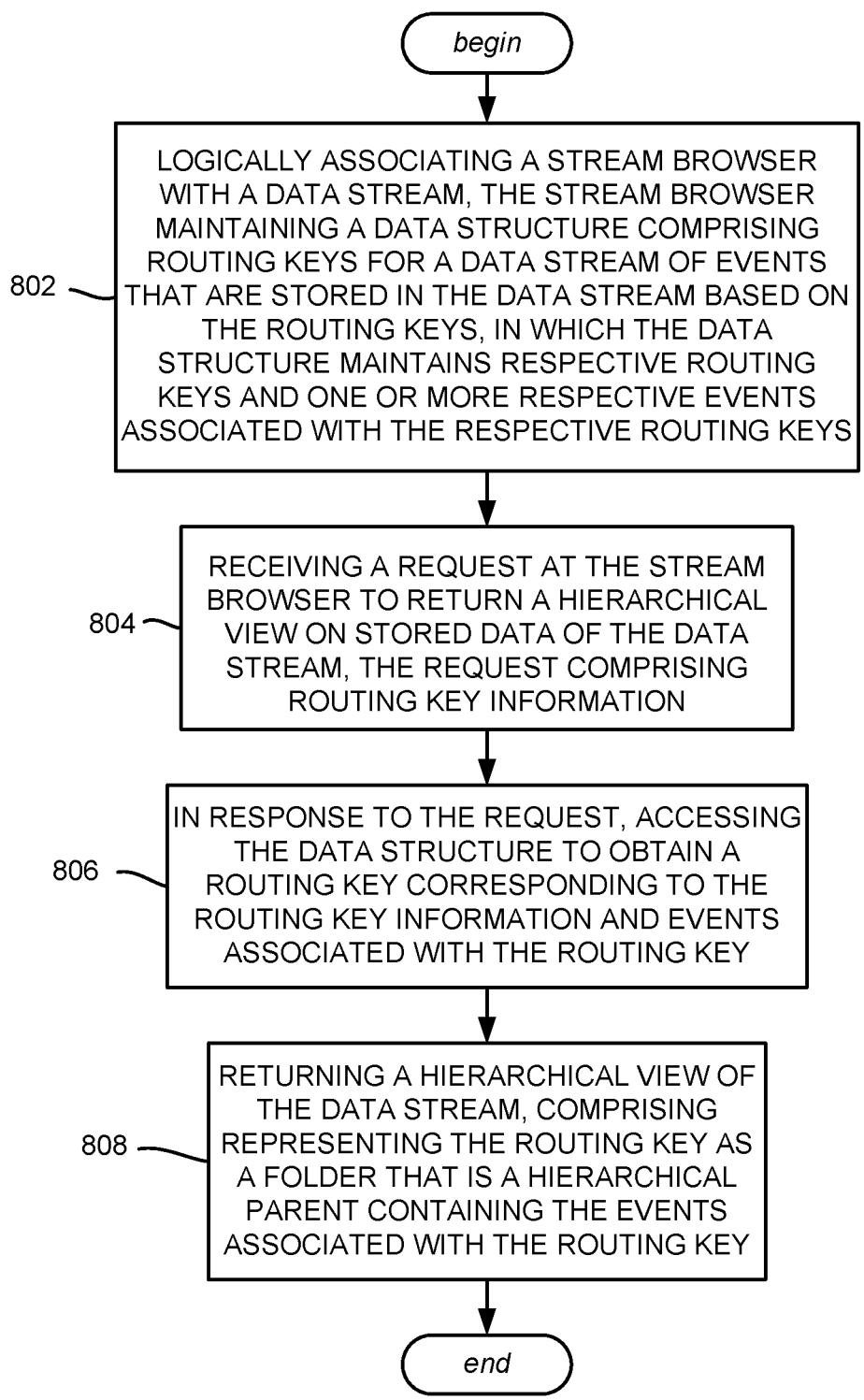
FIG. 8 is a flow diagram showing example operations related to associating a stream browser with a data stream for returning a hierarchical view of the data stream based on routing key information and event data maintained by the stream browser, in accordance with various aspects and implementations of the subject disclosure.

One or more example aspects, such as corresponding to example operations of a method, are represented in FIG. 8. Operation 802 represents logically associating a stream browser with a data stream, the stream browser maintaining a data structure comprising routing keys for a data stream of events that are stored in the data stream based on the routing keys, in which the data structure maintains respective routing keys and one or more respective events associated with the respective routing keys. Operation 804 represents receiving a request at the stream browser to return a hierarchical view on stored data of the data stream, the request comprising routing key information. Operation 806 represents in response to the request, accessing the data structure to obtain a routing key corresponding to the routing key information and events associated with the routing key. Operation 808 represents returning a hierarchical view of the data stream, comprising representing the routing key as a folder that is a hierarchical parent containing the events associated with the routing key.

Receiving the request can comprise receiving a list folder content request; the routing key information in the request can specify a first part of the routing key that corresponds to a folder, and returning the hierarchical view can comprise listing respective one or more second parts of the routing key as respective one or more subfolders with respective one or more events associated with the respective one or more subfolders.

Receiving the request can comprise receiving a read event request; the routing key information in the request can specify a full routing key, and returning the hierarchical view can comprise listing the full routing key as the folder containing the events.

The data structure can be a first data structure, and the stream browser can further maintain a second data structure that relates the routing key to a first stream position of a least recent event associated with the routing key and a second stream position of a most recent event associated with the routing key.

Aspects can comprise evicting events from the first data structure based on the least recent event.

Aspects can comprise configuring the hierarchical view of the data stream as an interactive sliding window over a selectable portion of the events associated with the routing key.

Figure 9:
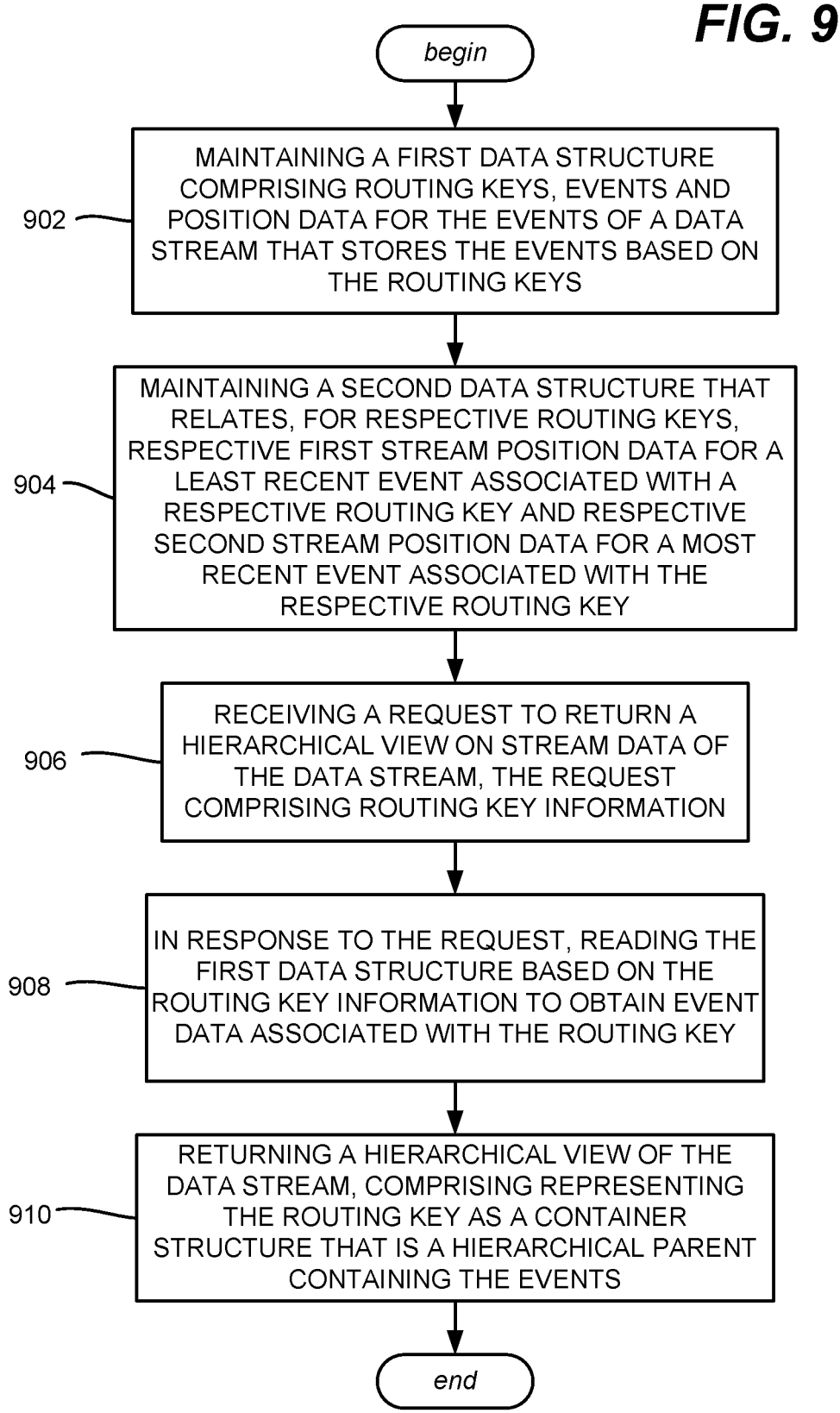
FIG. 9 is an example flow diagram showing example operations related to maintaining data structures for a data stream for accessing to return a hierarchical view of the data stream, in accordance with various aspects and implementations of the subject disclosure.

FIG. 9 summarizes various example operations, e.g., corresponding to a machine-readable storage medium, comprising executable instructions that, when executed by a processor of a streaming data storage system, facilitate performance of operations. Operation 902 represents maintaining a first data structure comprising routing keys, events and position data for the events of a data stream that stores the events based on the routing keys. Operation 904 represents maintaining a second data structure that relates, for respective routing keys, respective first stream position data for a least recent event associated with a respective routing key and respective second stream position data for a most recent event associated with the respective routing key. Operation 906 represents receiving a request to return a hierarchical view on stream data of the data stream, the request comprising routing key information. Operation 908 represents in response to the request, reading the first data structure based on the routing key information to obtain event data associated with the routing key. Operation 910 represents returning a hierarchical view of the data stream, comprising representing the routing key as a container structure that is a hierarchical parent containing the events.

Receiving the request can comprise receiving a list folder content request; the routing key information in the request can specify a first part of a routing key that corresponds to a folder, and returning the hierarchical view can comprise representing the first part of a routing key as a hierarchical parent folder containing one or more subfolders.

Receiving the request can comprise receiving a read event request; the routing key information in the request can specify a full routing key, and returning the hierarchical view can comprise listing the sorted events associated with the full routing key.

Further operations can comprise accessing the second data structure to remove an event from the first data structure based on the least recent event.

As can be seen, described herein is a technology that facilitates the presentation of convenient views on a stream's data. Such views can include more traditional hierarchical views such as common is standard graphical user interfaces, although custom views are possible. The stream browser technology described herein supports having multiple events with one routing key, operating under restricted resources conditions, stream truncation and fast building of hierarchical views for legacy streams. The technology is practical to implement.

Figure 10:
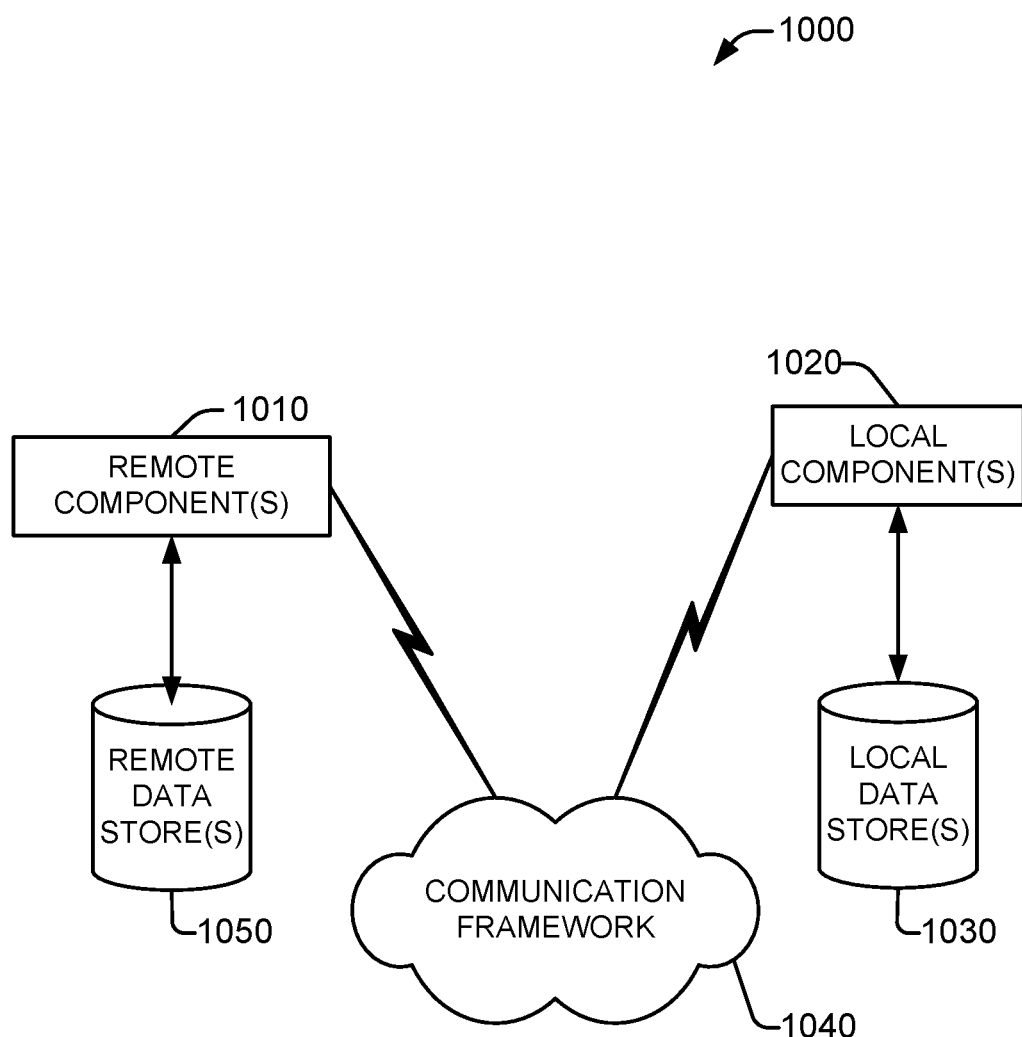
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
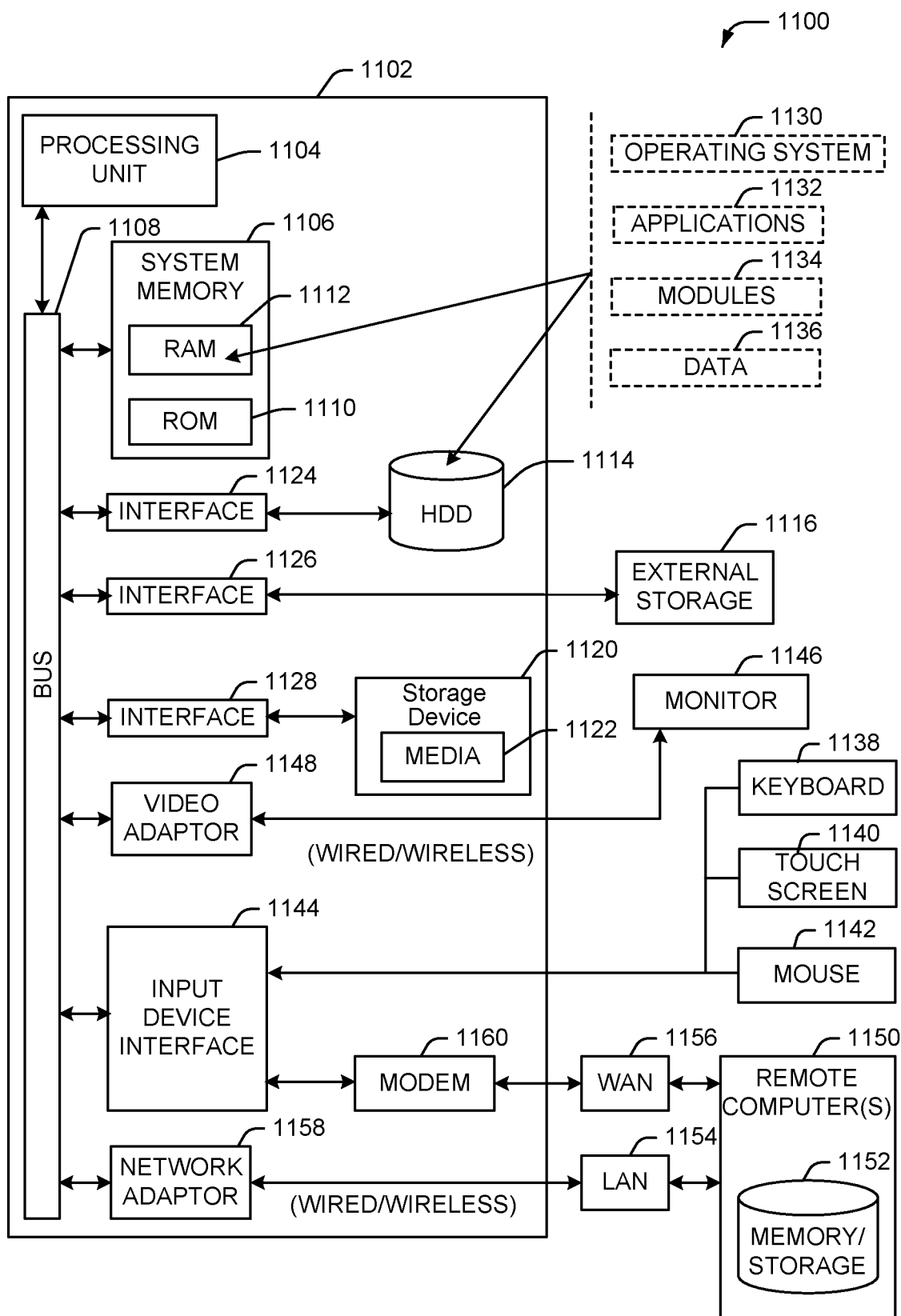
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory.

Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom.

Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
      receiving a request to return a hierarchical view on stream data of a data stream, the request comprising routing key information, wherein the data stream preserves stream data event order based on time according to a flat temporal storage topology, wherein the stream data is segregated into one or more segments of the data stream according to a routing key, and wherein a data structure comprises a routing key corresponding to non-temporal event data of an event of the events being stored via the data stream;
      in response to the request, reading the data structure to obtain the non-temporal event data corresponding to the routing key based on the routing key information; and
      rendering a display of the hierarchical view of the data stream without perturbing the data event order of the underlying data stream, the hierarchical view being based on the routing key corresponding to the non-temporal event data rather than rendering a flat view based on the flat temporal topology of the data stream, wherein the hierarchical view represents the routing key as a container structure, and wherein the container structure is a hierarchical parent containing the event data associated with the container structure.

2. The system of claim 1, wherein the receiving the request comprises receiving a list folder content request, wherein the routing key information in the request specifies a first part of the routing key that corresponds to a folder, and wherein the returning the hierarchical view comprises listing respective one or more second parts of the routing key as respective one or more subfolders with respective one or more events as the event data associated with the respective one or more subfolders.

3. The system of claim 1, wherein the receiving the request comprises receiving a list folder content request, wherein the routing key information in the request specifies null or an empty string, and wherein the returning the hierarchical view comprises listing subfolder content and event content of a root folder.

4. The system of claim 1, wherein the receiving the request comprises receiving a read event request, wherein the routing key information in the request specifies a full routing key, and wherein the returning the hierarchical view comprises listing one or more events associated with the full routing key as the event data associated with the container structure corresponding to the full routing key.

5. The system of claim 1, wherein the event data comprises two or more events, wherein the data structure comprises stream position data for each of the two or more events, and wherein the operations further comprise sorting the events by respective stream position data before returning the hierarchical view of the data stream.

6. The system of claim 1, wherein the data structure is a first data structure, and wherein the operations further comprise maintaining a second data structure that relates respective routing keys to respective event positions in the data stream, wherein the respective event positions in the data stream are embodied in the flat temporal topology as a result of the events having been sequentially written into the data stream as a function of time, wherein the respective event positions for a respective routing key identify a respective first position in the data stream of a least recent event associated with the respective routing key and a respective second position in the data stream of a most recent event associated with the respective routing key.

7. The system of claim 6, wherein the event data comprises two or more events, and wherein the operations further comprise accessing the second data structure based on the routing key to evict one or more least recent events from the first data structure.

8. The system of claim 6, wherein the data stream is associated with a stream cut, wherein the data stream is truncated to remove events based on the stream cut, and wherein the operations further comprise, accessing the second data structure based on the stream cut to remove event data from the first data structure that correspond to truncated events, and to modify event position data in the second data structure.

9. The system of claim 1, wherein the event data exceeds a resource limitation, and wherein the returning the hierarchical view of the data stream comprises providing a sliding window of event data that does not exceed the resource limitation.

10. The system of claim 1, wherein the maintaining the data structure comprising the routing keys for the data stream comprises maintaining a hierarchical data index.

11. A method comprising:
  logically associating a stream browser with a data stream of events comprising routing keys, wherein events that have been written into the data stream are stored in an order that both preserves data event order by time according to a flat temporal storage topology and separates data events into one or more data storage segments of the data stream according to the routing keys, the stream browser maintaining a data structure comprising the routing keys according to a hierarchical topology based on the values of the routing keys rather than the sequential order of the events in the data stream;
  receiving a request at the stream browser to return a hierarchical view on stored data of the data stream, the request comprising routing key information;
  in response to the request, accessing the data structure to obtain a routing key corresponding to the routing key information and events associated with the routing key; and
  presenting, via a display device, a hierarchical view of the data stream without perturbing the data event order of the data stream, comprising representing the routing key as a folder that is a hierarchical parent containing the events associated with the routing key.

12. The method of claim 11, wherein the receiving the request comprises receiving a list folder content request, wherein the routing key information in the request specifies a first part of the routing key that corresponds to a folder, and wherein the returning the hierarchical view comprises listing respective one or more second parts of the routing key as respective one or more subfolders with respective one or more events associated with the respective one or more subfolders.

13. The method of claim 11, wherein the receiving the request comprises receiving a read event request, wherein the routing key information in the request specifies a full routing key, and wherein the returning the hierarchical view comprises listing the full routing key as the folder containing the events.

14. The method of claim 11, wherein the data structure is a first data structure, and wherein the stream browser further maintains a second data structure that relates the routing key to a first stream position of a least recent event associated with the routing key and a second stream position of a most recent event associated with the routing key.

15. The method of claim 14, further comprising, evicting events from the first data structure based on the least recent event.

16. The method of claim 11, further comprising, configuring the hierarchical view of the data stream as an interactive sliding window over a selectable portion of the events associated with the routing key.

17. A non-transitory machine-readable storage medium, comprising executable instructions that, when executed by a processor of a streaming data storage system, facilitate performance of operations, the operations comprising:
  maintaining a first data structure comprising routing keys, events, and position data for the events of a data stream that stores the events sequentially in the data stream according to time via a flat temporal topology and simultaneously stores, based on the routing keys, the events to the data stream according to one or more data storage segments of the data stream, wherein the first data structure provides a hierarchical topology of the events based on the routing keys, while preserving the event order of the data stream, rather than on the sequence in which the events are stored via the data stream;
  maintaining a second data structure that relates, for respective routing keys, respective first stream position data for a least recent event associated with a respective routing key and respective second stream position data for a most recent event associated with the respective routing key;
  receiving a request to return a hierarchical view on stream data of the data stream, the request comprising routing key information;
  in response to the request, reading the first data structure based on the routing key information to obtain event data associated with the routing key; and
  returning a hierarchical view of the data stream to a display device, comprising representing, via the display device, the routing key as a container structure that is a hierarchical parent containing the events.

18. The non-transitory machine-readable medium of claim 17, wherein the receiving the request comprises receiving a list folder content request, wherein the routing key information in the request specifies a first part of a routing key that corresponds to a folder, and wherein the returning the hierarchical view comprises representing the first part of a routing key as a hierarchical parent folder containing one or more subfolders.

19. The non-transitory machine-readable medium of claim 17, wherein the receiving the request comprises receiving a read event request, wherein the routing key information in the request specifies a full routing key, and wherein the returning the hierarchical view comprises listing the sorted events associated with the full routing key.

20. The non-transitory machine-readable medium of claim 17, wherein the operations further comprise accessing the second data structure to remove an event from the first data structure based on the least recent event.

* * * * *